Jan. 23, 1968  R. D. OAKLEAF ET AL  3,364,577
ELECTRICALLY HEATED DENTAL WAX SUPPLYING AND MANIPULATING TOOLS
Filed June 7, 1965  3 Sheets-Sheet 1
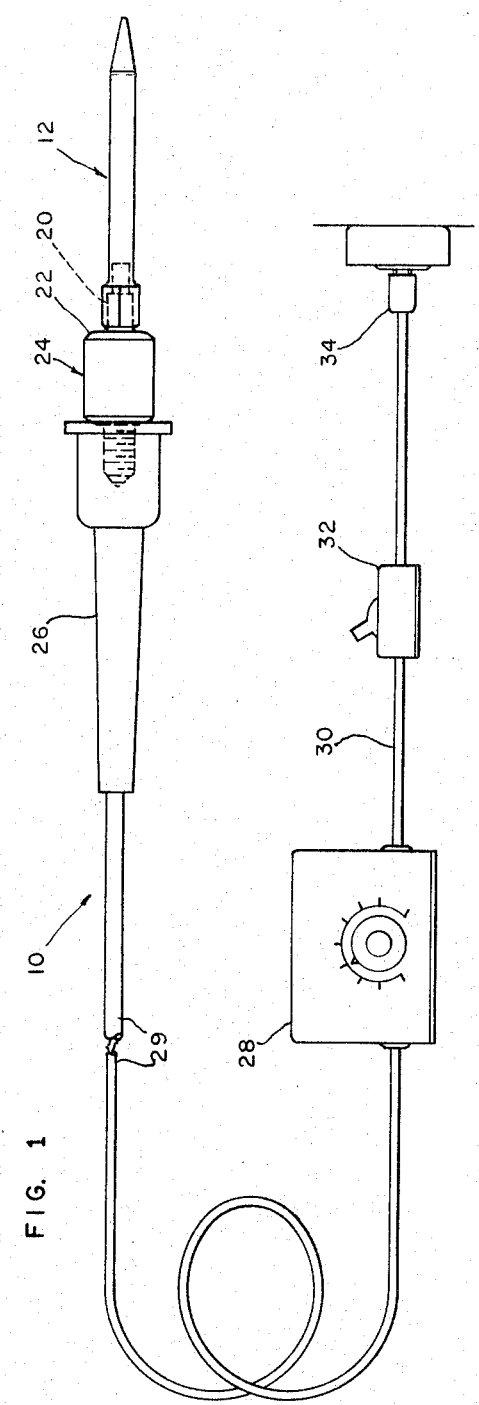
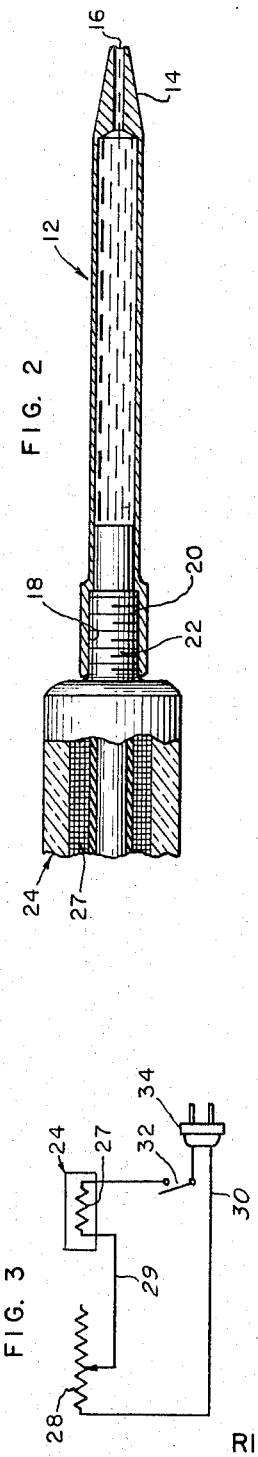
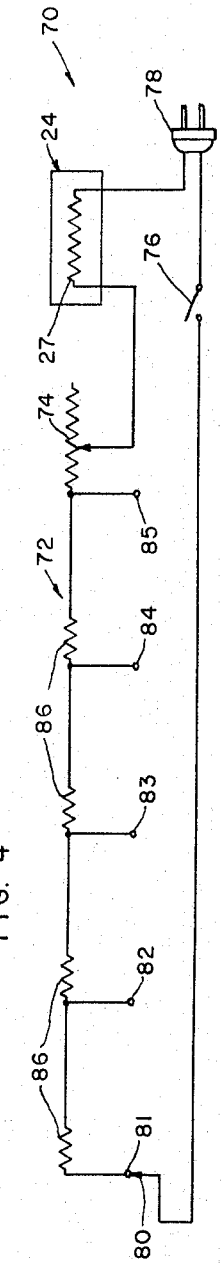
RICHARD D. OAKLEAF
RONALD C. RICKERT
INVENTORS
BY
BUCKHORN, BLORE, KLARQUIST & SPARKMAN
ATTORNEYS

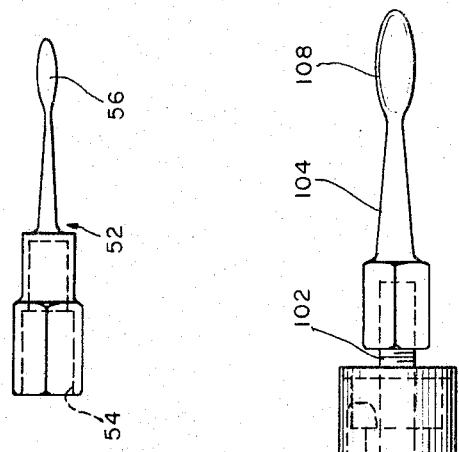
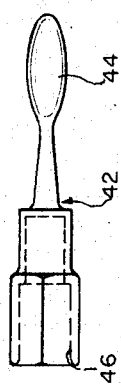
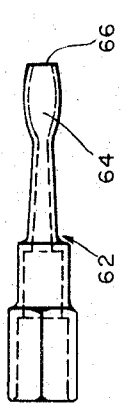
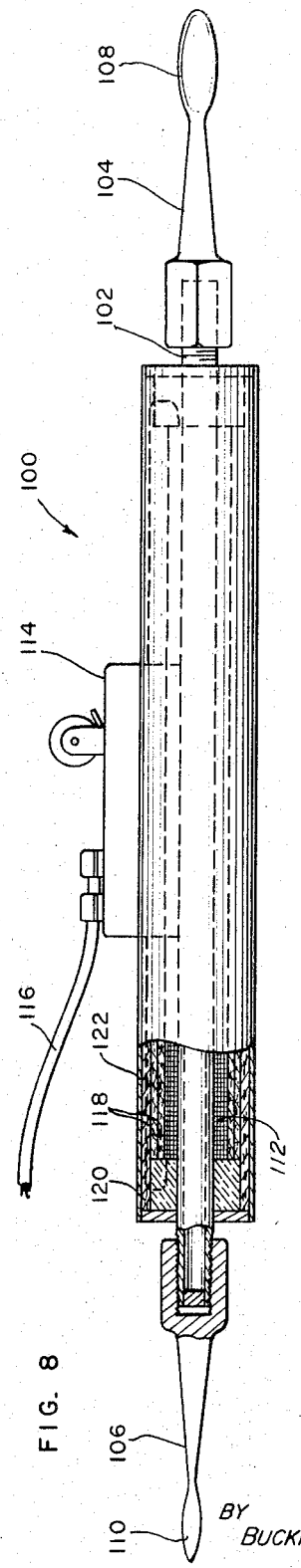
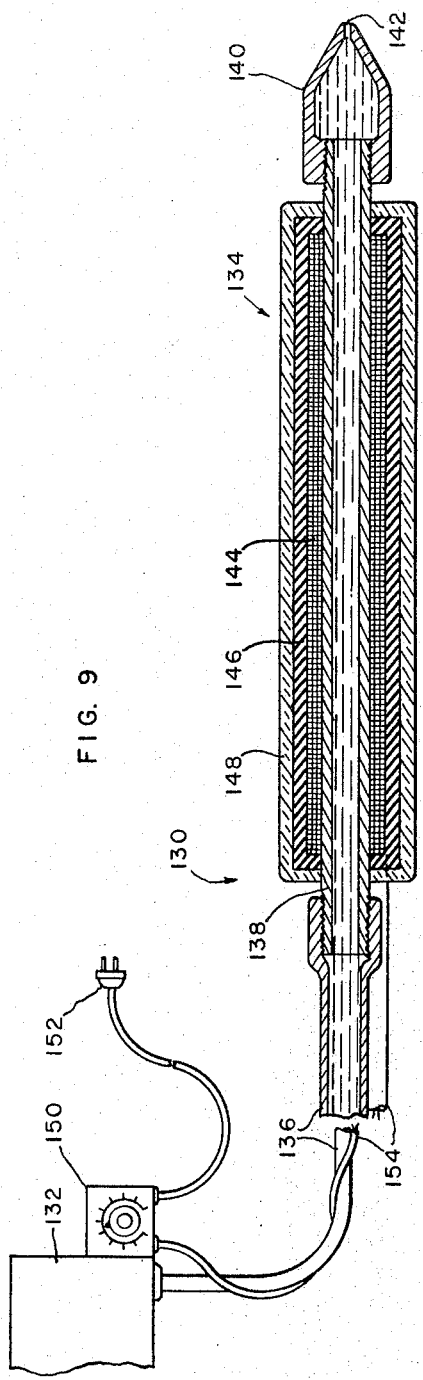
Jan. 23, 1968    R. D. OAKLEAF ET AL    3,364,577
ELECTRICALLY HEATED DENTAL WAX SUPPLYING AND MANIPULATING TOOLS
Filed June 7, 1965
RICHARD D. OAKLEAF
RONALD C. RICKERT
INVENTORS
BY BUCKHORN, BLORE, KLARQUIST & SPARKMAN
ATTORNEYS Jan. 23, 1968  R. D. OAKLEAF ET AL  3,364,577
ELECTRICALLY HEATED DENTAL WAX SUPPLYING AND MANIPULATING TOOLS
Filed June 7, 1965  3 Sheets-Sheet 3
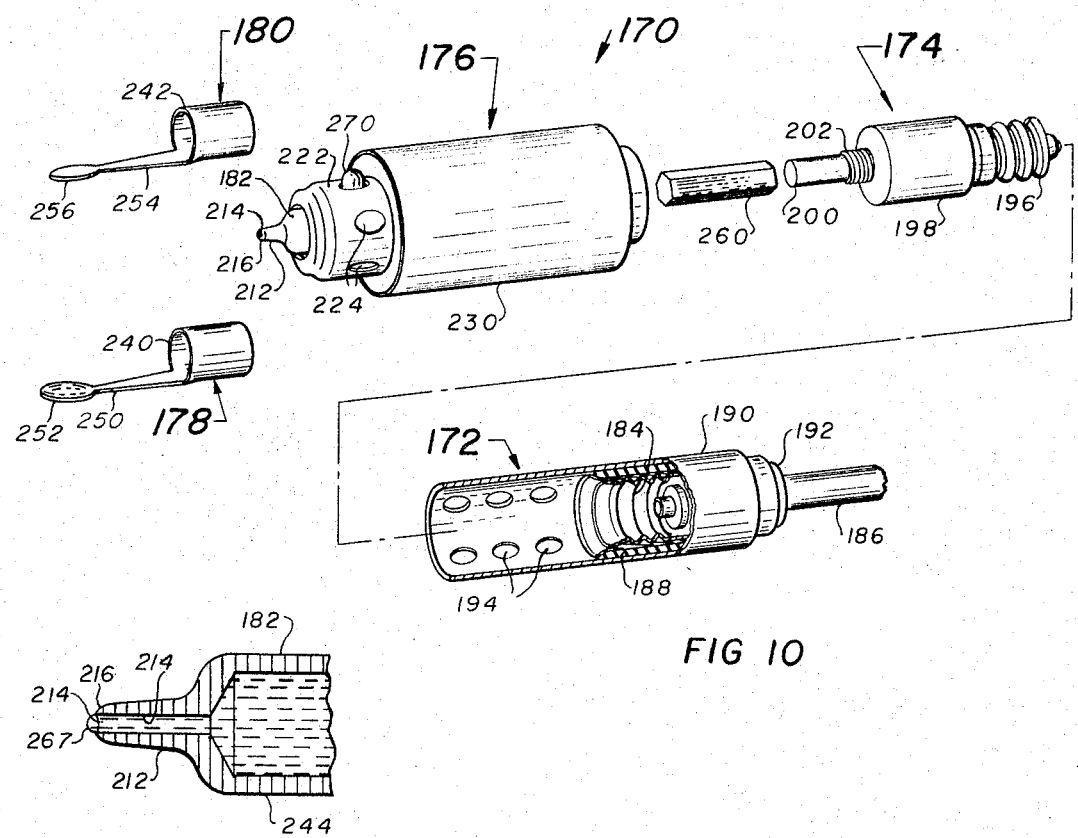
FIG 10
FIG 12
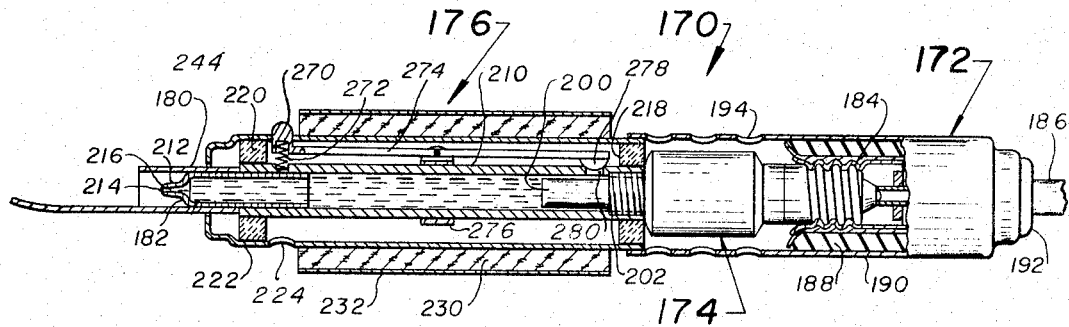
FIG 11
RICHARD D. OAKLEAF
RONALD C. RICKERT
INVENTOR
BY
BUCKHORN, BLORE, KLARQUIST & SPARKMAN
ATTORNEYS

United States Patent Office 3,364,577
Patented Jan. 23, 1968

3,364,577
ELECTRICALLY HEATED DENTAL WAX SUPPLYING AND MANIPULATING TOOLS
Richard D. Oakleaf, 2809 SW. Water St. 97201, and Ronald C. Rickert, 9136 N. Wall St. 97203, both of Portland, Oreg.
Filed June 7, 1965, Ser. No. 461,663
5 Claims. (Cl. 32—70)

ABSTRACT OF THE DISCLOSURE

Electrically heated dental wax shaping and supplying tools having quick-detachable tips. Some tips are shaping tips, while others are nozzles which both supply and shape the wax. In one embodiment a hollow tip serves as a wax reservoir. A second embodiment provides a tool with a ladling tip at one end and a shaping tip at the other. Another embodiment has a stationary reservoir supplying melted wax to a tool having a dispensing tip. In a still further embodiment, the tool has slip-on tips attachable to a wax shaping and supplying tip unit which is detachable from the heating unit of the tool to permit a stick of wax to be inserted in a reservoir of the tip unit.

---

This invention relates to dental wax manipulating electric tools, and more particularly to electric tools for ladling and working wax in making wax denture patterns.

In making dentures, an impression is made of the patient's mouth, a preliminary mold of plaster is made from the impression, a wax pattern with the teeth therein then is made on the plaster mold, a mold is made from the wax pattern, the wax is melted and removed from the mold, and a denture-forming plastic is supplied to the mold and is hardened therein. Hitherto, in constructing the wax pattern, the wax is ladled and shaped on a preliminary mold with a double-ended hand tool having a ladle on one end and a shaping head on the other end. The ends of the tool are heated intermittently by a Bunsen burner or the like to keep them within a narrow range of temperature critical for expeditiously ladling and shaping the wax. Such heating is frequent and time consuming, and requires a high degree of skill in the user of the tool. It would be desirable to provide tools for ladling and shaping dental wax without the frequent interruptions hitherto necessitated to maintain proper temperature.

An object of the invention is to provide dental wax manipulating electric tools.

Another object of the invention is to provide electric tools for ladling and working wax in making wax denture patterns.

A further object of the invention is to provide an electric tool for ladling dental wax at a precise, optimum temperature and adapted to have shaping tips attached quickly thereto.

Another object of the invention is to provide an electric tool having a tip maintained at an optimum temperature for shaping dental wax.

The invention provides dental wax manipulating electric tools in which a manipulating tip is heated to and maintained at an optimum manipulating temperature by electric heating means carried with the tip and controlled by an automatic control. In a tool forming one specific embodiment of the invention, a tubular tip member is kept at a desired optimum ladling temperature by an electrical resistance heater heating the member and controlled by an adjustable resistance, the tip member having dental wax therein and supplying the wax as desired through an orifice of the desired shape in the tip end of the member. Shaping tips of configurations suitable to shape the wax may be attached seriatim to the tip member to shape the wax so ladled. In a tool forming another embodiment of the invention, a tip member having a tip adapted for shaping wax is heated by an electrical resistance heater controlled either by an electrical resistance or a thermostat.

A complete understanding of the invention may be obtained from the following detailed description of dental wax manipulating electric tools forming specific embodiments thereof, when read in conjunction with the appended drawings, in which:

FIG. 1 is an elevation view of a dental wax manipulating electric tool forming one embodiment of the invention;

FIG. 2 is an enlarged, partially sectional view of a tip member of the tool of FIG. 1;

FIG. 3 is a schematic view of a controlled heating circuit of the tool of FIG. 1;

FIG. 4 is a schematic view of a controlled heating circuit adapted to be used in the tool of FIG. 1 in place of the circuit of FIG. 3;

FIGS. 5, 6 and 7 are enlarged, fragmentary views of alternate tip members of the tool of FIG. 1;

FIG. 8 is an enlarged, fragmentary, partially sectional view of a dental wax manipulating electric tool forming an alternate embodiment of the invention;

FIG. 9 is an enlarged, fragmentary, partially sectional view of a dental wax manipulating electric tool forming an alternate embodiment of the invention;

FIG. 10 is an exploded, perspective view of a dental wax manipulating electric tool forming an alternate embodiment of the invention;

FIG. 11 is a longitudinal section of the tool of FIG. 10; and

FIG. 12 is an enlarged, fragmentary longitudinal section of a ladling tip of the tool of FIG. 10.

Referring now in detail to the drawings, a tool 10 (FIGS. 1 and 2) forms one embodiment of the invention including a ladling tip member 12 having a rounded shaping and dispensing tip 14. The tip member 12 has a generally cylindrical dispensing orifice 16 and is tubular in form to hold a supply of dental wax which flows through the orifice 16 when the tip 14 is positioned lowermost. The shank end of the tip member has an internally threaded portion 18 adapted to be screwed on a threaded end portion 20 of a metal rod 22 of high heat conductivity of an electrical resistance heating unit 24, which may be of a known, commercially available type such as, for example, the electrical resistance heating unit of a wood burning tool. A handle portion 26 of heat insulation encloses the shank portion of the heating unit. A resistor 27 of the heating unit is connected by an electrical cord 29 to a rheostat 28 which is connected by an electrical cord 30 having a manually operable switch 32 therein to a plug 34 adapted to connect the rheostat to a conventional source of power. The rheostat may be quickly set from one condition to another for waxes having different optimum working temperatures.

In the operation of the tool 10, with the tip member 12 removed, the tip member 12, which is of stainless steel or copper, is filled with dental wax and is threaded onto the end portion 20 of the rod 22 of the heating unit 24. Power supplied to the resistor 27 through the rheostat 28 heats the tip member 12 through the rod 22 to a temperature at which the wax in the tip member 12 is maintained at a temperature such that the wax flows at the desired rate through the orifice 16 and is at the optimum temperature for placement and shaping for a time after the wax has been ladled from the tool. To ladle or dispense the wax from the tool to form the wax pattern, the tip member is tilted downwardly and a bead of wax is placed as desired by the tip member, the tip member also being manipulated to shape the wax being laid down.

After the desired quantity of wax is ladled, the tip member 12 may be replaced by a tip member 42 (FIG. 6) having a tip 44 of the shallow, ladling spoon shape of conventional working tools known hitherto, and this tip member is used to effect part of the shaping of the dental wax. The tip member 42 has a tapped socket 46 adapted to thread onto and closely engage the end portion 20 of the shell 22 of the heating unit 24, which heats the tip member 42 quickly to an optimum working temperature and maintains the tip member at this temperature. The tip member 42 may be replaced, after the shaping for which it is best suited has been effected, with a tip member 52 which has a tapped socket 54 and a tip 56 of the shape of the arrowhead-like tips of conventional tools used hitherto. The tip members 42 and 52 are preferably composed of stainless steel but may also be composed of copper for even high heat conductivity.

A ladling tip member 62 (FIG. 5) may be used in place of the tip member 12 where it is desired to ladle the wax in a strip or ribbon form. The tip member 62 has a wider, flatter tip 64 than the tip 14 and has a slit-like orifice 66. The tip 64 may be shaped substantially like the tip 44 (FIG. 6) if desired. When the tubular tip member 64 is to be used with the tool 10, the tip member 64 is filled with wax and is threaded onto the threaded end portion 20 of the shell 22 of the heating unit 24. The heating unit transfers heat to the tip member 64 to quickly heat the wax to the desired temperature and maintains the wax at this temperature.

In one constructed embodiment of the tool 10, for use in a 110 volt circuit, the heating unit 24 was rated at 20 watts, the resistor 27 was about 700 ohms, and the rheostat 28 was variable from 0 to 3500 ohms.

An electrical circuit 70 usable in place of the electrical circuit of FIG. 3 is shown in FIG. 4. The circuit 70 includes a stepped, adjustable resistor 72 connected in series with a rheostat 74, the resistor 27, a switch 76 and a connector plug 78. The resistor 72 includes a contactor 80 movable into selected engagement with contacts 81 to 85, which have resistors 86 connected therebetween. Preferably the rheostat 74 is variable from 0 to 1000 ohms and each of the resistors 86 has a resistance of 600 ohms. The circuit 70 provides for quick, very precise adjustments for waxes having different optimum ladling or working temperatures.

A tool 100 (FIG. 8) forming an alternate embodiment of the invention includes a copper tube 102 having secured to one end thereof a tip member 104 of stainless steel or copper and also having secured to the other end thereof a tip member 106 of stainless steel or cooper. The tip member 104 has a ladling tip 108 and the tip member 106 has a shaping tip 110. The tube 102 is heated by a resistor 112 to a temperature to maintain the tips 108 and 110 at the optimum ladling and working temperature. The resistor 112 is insulated electrically, is wound helically on the tube 102 in excellent heat exchange relationship therewith, is preferably of about 60 ohms, and is supplied with power through an adjustable thermostat 114 of known construction mounted in heat exchanging relationship with the tube 102 and responsive to the temperature of the tube 102. An electrical cord 116 supplies power to the tool from a suitable electrical outlet. A plurality of wraps of asbestos tape 118 are formed on the exterior of the resistor 112 and are enclosed in a porcelain tube 120 having a grip 122 on the exterior thereof which has an inner layer of cork and an outer layer of Styrofoam. The tube 102 keeps the tip members 104 and 106 at an optimum temperature for ladling and shaping the dental wax. The thermostat 114 may be manually adjusted precisely to different desired temperatures for waxes having different temperature characteristics. The tool 100 may be used to both ladle and shape wax without interruption to heat the tips, the tips 108 and 110 always being at the desired temperature.

A continuous ladling tool 130 is adapted to supply dental wax continuously at the desired temperature, and includes a heated, elevated reservoir 132 holding a supply of dental wax at a flowable temperature and supplying the wax to a tubular tool unit 134 through a flexible tube 136 which preferably is heated to maintain the wax fluid. The tube 136 is connected to a copper tube 138 having a nozzle tip 140 adapted to shape wax and having an orifice 142. The tube 138 is heated by a resistor 144 spiraled therearound and embedded in electrical insulation 146. A combined heat insulation and grip 148 forms a handle and forms the exterior of the unit 134. The tool 130 is adapted to continuously apply and shape wax, and preferably is used in conjunction with the tool 10 with the latter provided with the shaping tip member 52. A rheostat 150 controls the supply of power from a plug 152 to the resistor 144. A cord 154 connecting the resistor 144 to the rheostat 150 is spiraled around the tube 136.

A dental wax manipulating tool 170 (FIGS. 10 and 11) forming a preferred embodiment of the invention includes a socket unit 172, a heating unit 174, a combined handle and ladling unit 176 and shaping tools 178 and 180 adapted to be selectively mounted on tubular ladling tip 182 of the unit 176. The socket unit 172 includes a known, internally threaded, electrical outlet socket 184 adapted to receive power from a conventional electric outlet (not shown) through a rheostat (not shown) and an electric cord 186 connecting the socket 184 to the rheostat. The socket 184 is mounted in electrical and thermal insulation 188 in a copper or brass tube 190, and the cord 186 extends through a grommet 192 in the end of the tube 190. The tube has ventilating holes 194.

The heating unit 174 is commercially available and has an externally threaded electrical connector portion 196 adapted to be screwed into the socket 184 and transmit electrical current to a heating resistor (not shown) encased in a ceramic insulator 198. The resistor heats a heater rod 200 in accordance with power supplied to the resistor as controlled by the rheostat. The lefthand end portion of the portion of the heater rod projecting beyond the insulator 198 has an external threaded portion 202.

The combined handle and ladling unit 176 includes a copper tube 210 threaded internally so as to be adapted to screw onto the threaded portion 202 of the rod 200 and to receive the rod in a close, heat-receiving position. The tubular ladling tip 182 is of copper, and fits closely into the lefthand end portion of the tube 210, as viewed in FIG. 11, and is brazed thereto. The tip 182 has a reduced, tip portion 212 having a small cylindrical orifice 214 leading through a rounded end 216. The orifice 214 preferably should be of a size formed by a drill of a drill size of from 60 to 80. Ceramic washers 218 and 220 cemented to the tube 210 and to a larger, brass or copper tube 222 mount the tube 222 concentrically on and spaced from the tube 210. The lefthand end portion of the tube 222 has ventilating holes 224 therein for air cooling the tube 210 along substantially the entire length thereof to remove excess heat therefrom. A handle portion 230 of cork is cemented to the exterior of the tube 222 and a thin surface layer 232 of plastic material covers the cork handle portion.

For shaping wax ladled by the unit 176, either the tool 178 or the tool 180, or both, may be used, one at a time, of course, by sliding a sleeve or clip portion 240 or a sleeve or clip portion 242 onto large diameter portion 244 of the tip 182. The sleeve portions 240 and 242 fit closely on the portion 244 and are retained thereon by friction. If desired, the sleeve portions may be slit longitudinally so as to resiliently clamp to the portion 244. The close-fitting engagements of the sleeve portions with the portion 244, in addition to frictionally retaining the tools on the tip 182, also effect excellent thermal conduction from the tip 182 to the tool 178 or 180 to rapidly heat the tool. The tools 178 and 180 are of copper, brass or other metal of high heat conductivity, and rapidly are heated to the desired temperature for shaping the wax. The tool 178 has a shank 250 and a tip portion 252 shaped like a ladling spoon, and is used for certain shaping operations. The tip member 180 has a shank 254 and a tip portion 256 shaped like the tip 56 of the tip member 52, and is used for other shaping operations.

In the operation of the tool 170, the unit 176 is detached from the unit 174 and a commercially available stick 260 (FIG. 10) of dental wax is inserted into the tube 210 from the rear end thereof. The unit 176 then is screwed onto the rod 200 which, preferably, is at its operating temperature as heated by the unit 174 with the rheostat set at the desired temperature. The tube 210 and tip 182 are quickly heated, and the wax stick is quickly heated to the desired ladling temperature at which it is melted and of optimum consistency for dispensing and shaping. The melted wax flows into the tip 182 and fills the orifice 214 with a crown or meniscus 267 projecting from the rounded end 216. The wax will not flow further through the orifice 214 until the meniscus is placed in contact with a cooler object and the end 216 moved along the object, in which latter step the wax is drawn through the orifice and laid down on the object in a line or bead. This contact feed of the wax rapidly dispenses the wax and permits precise location of the wax so dispensed. The rounded end 216 also may be utilized for shaping the ladled wax.

After the desired quantity of wax has been ladled, the tools 178 and 180 may be placed on the tip 182 as needed and used to shape the ladled wax. When one of the tools 178 and 180 is placed on the tip 182, the tool 178 or 180 is rapidly heated to the desired working temperature, and is maintained thereat as the tool is used. The holes 194 and 224 in the tubes 190 and 222, respectively, permit air to flow into and out of the tubes 190 and 222. This prevents overheating of the units 172, 174 and 176.

When it is desired to dispense wax from the tool 170 more rapidly than by contact feed as described above, a pushbutton 270 is manually depressed against the action of a spring 272. This pivots a rod-like lever 274 mounted pivotally by bracket 276 in a counterclockwise direction, as viewed in FIG. 11, to swing a resilient plug member 278 away from its normal position closing venting hole 280. This opens the hole 280 to atmospheric pressure to break the lower pressure previously in the tube 210 and permit the wax to flow rapidly through the orifice 214. To lower the rate of flow, the operator releases the pushbutton 270 and the spring 272 pivots the lever to its normal position in which it holds the plug 278 in a position sealing the venting hole 280, and a vacuum builds up quickly in the tube 210.

The above-described tools ladle and shape dental wax without the frequent interruptions formerly necessary to perform these functions so that, for making many denture patterns, only small fractions of the times formerly necessitated are required. Not only are the times formerly required for actually heating the tools dispensed with, but the tools now are kept constantly at the optimum temperatures so that maximum speed is maintained continuously, not just for the short time in each working period at which the intermittently heated tools used hitherto were at the optimum working and/or ladling temperature.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a dental wax manipulating electric tool,
    a socket unit having an electrical socket and an electrical cord leading thereto,
    a heater unit having at one end an electric plug portion adapted to fit into the socket, a resistance, and a heater rod at the other end thereof heated by the resistance,
    and a tip unit having a thermally insulated, exterior, handle portion and an interior hollow sleeve means surrounded by and carrying the handle portion and having a socket portion at one end adapted to fit on the heater rod and having at its other end a dispensing tip for dispensing melted wax from the interior thereof.

2. The dental wax manipulating electric tool of claim 1 including a tip member having a clip portion adapted to be detachably secured to the sleeve means, a shank portion extending beyond the tip and a tip portion carried by the shank portion and adapted to shape wax.

3. In a dental wax manipulating electric tool,
    an electrical socket,
    an electric cord connected to the socket,
    a first tube,
    insulating means mounting the socket in one end of the tube and forming a socket unit with the socket, the cord and the tube,
    an electric resistance unit having a plug portion adapted to fit into the socket,
    an electrical resistance heating means surrounded by the tube and a heater rod heated by the heating means and having a threaded portion,
    a sleeve having a threaded portion at one end adapted to be screwed onto the heater rod,
    a hollow tip member secured to the other end of the sleeve and having a reduced tip portion provided with a dispensing orifice and a rounded end,
    a second tube having an insulated handle portion,
    and insulating means mounting the second tube on the sleeve in a position in which the tip portion extends beyond the second tube.

4. The dental wax manipulating electric tool of claim 3 wherein the orifice is of a size which permits melted wax to be pulled therethrough when the tip portion engages an article and is moved therealong and prevents free flow of wax through the orifice when the interior of the sleeve is not vented.

5. The dental wax manipulating electric tool of claim 4 including manually operable means for venting the interior of the sleeve.

References Cited
UNITED STATES PATENTS

| | | | |
|---|---|---|---|
| 1,070,905 | 8/1913 | McRae et al. | 32—70 |
| 1,457,508 | 6/1923 | Dellman | 219—230 X |
| 1,478,319 | 12/1923 | Young | 219—236 X |
| 1,724,070 | 8/1929 | Byrne et al. | 219—230 X |
| 1,909,774 | 5/1933 | Lindsay | 219—238 X |
| 2,111,645 | 3/1938 | Slutzky et al. | 32—70 |
| 2,119,908 | 6/1938 | Ellis | 219—229 |
| 2,206,994 | 7/1940 | Zent | 32—70 X |
| 2,454,576 | 11/1948 | Slack | 32—70 X |
| 2,468,818 | 5/1949 | Fox et al. | 32—70 X |
| 3,264,449 | 8/1966 | Brenner | 219—227 |

ANTHONY BARTIS, *Primary Examiner.*